June 4, 1940.   J. D. ZAHM   2,202,938
ANIMAL TRAP
Filed Dec. 3, 1938   5 Sheets-Sheet 1
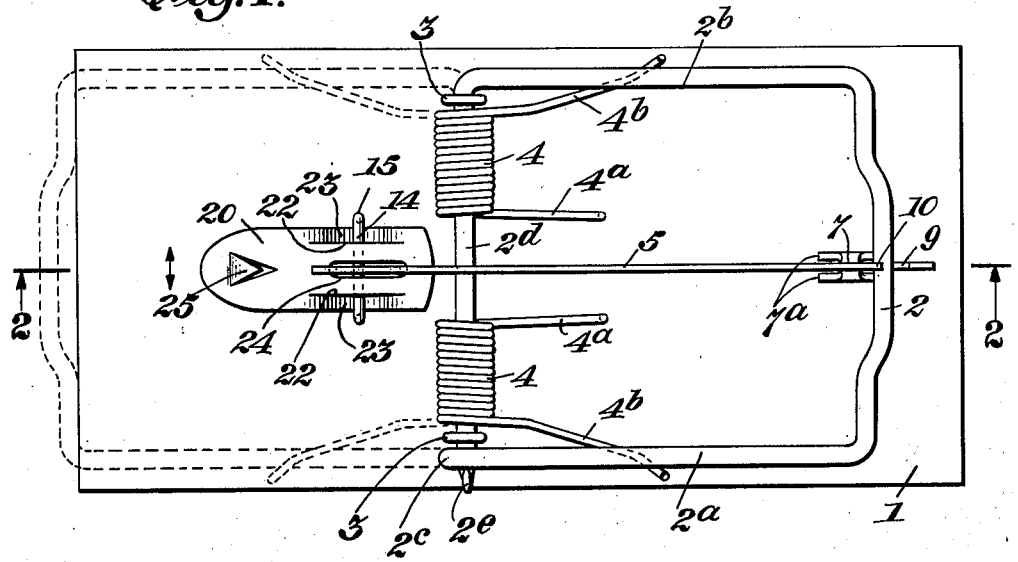
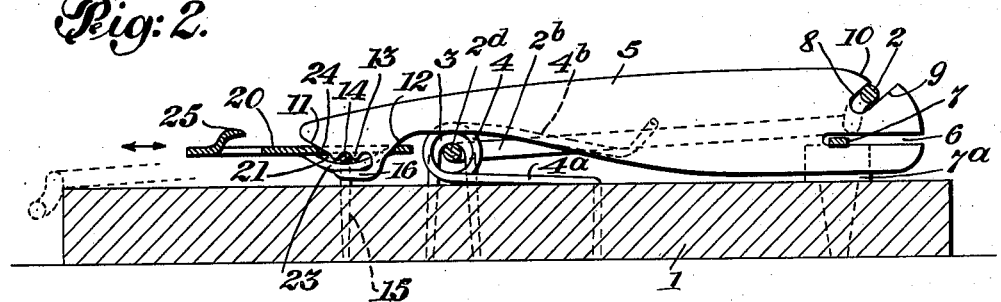
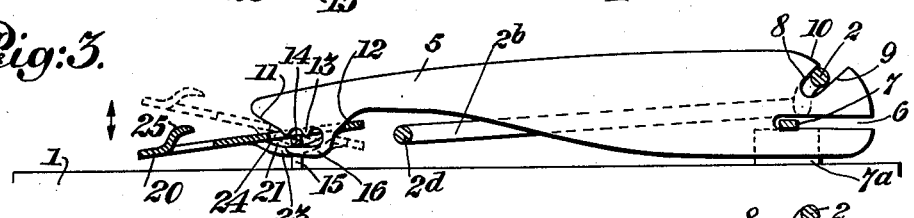
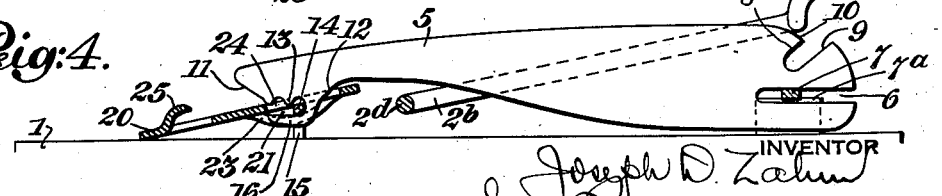
INVENTOR
Joseph D. Zahm
BY Louis Prevost Whitaker
ATTORNEY

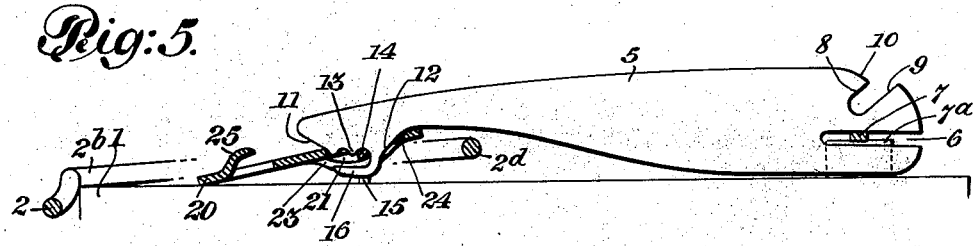
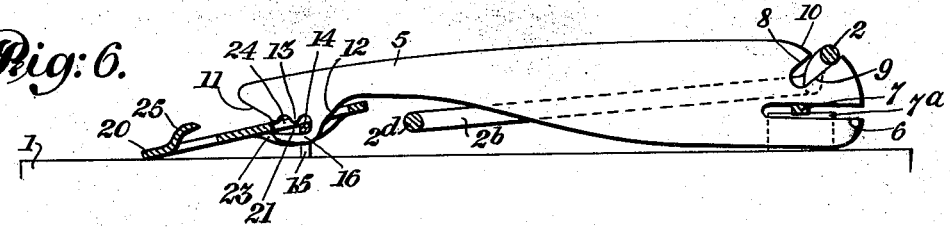
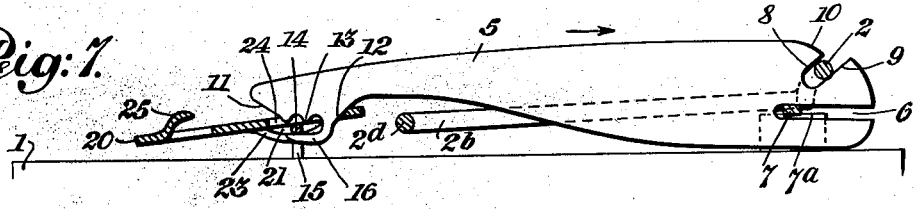
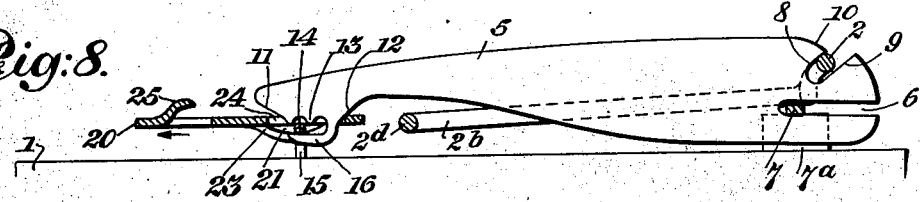
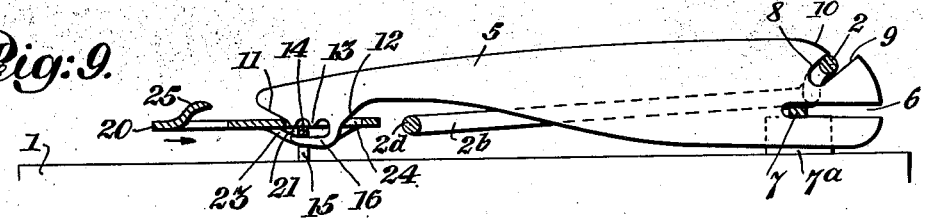

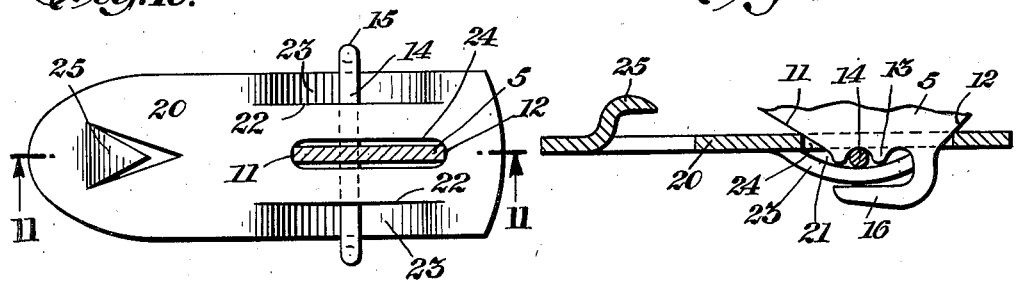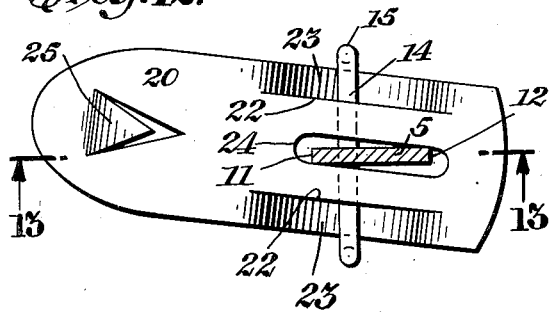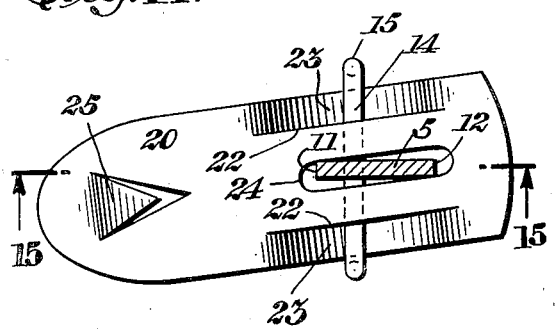

June 4, 1940.  J. D. ZAHM  2,202,938
ANIMAL TRAP
Filed Dec. 3, 1938   5 Sheets-Sheet 4
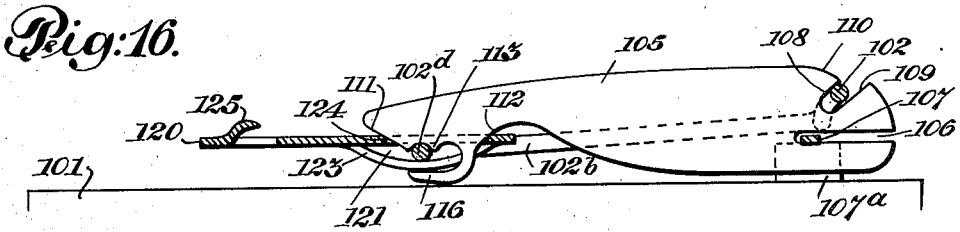
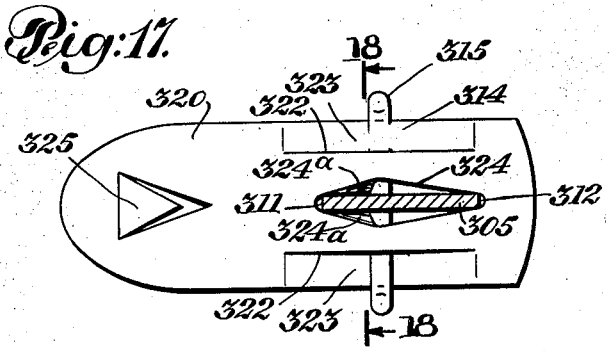 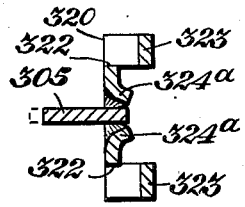
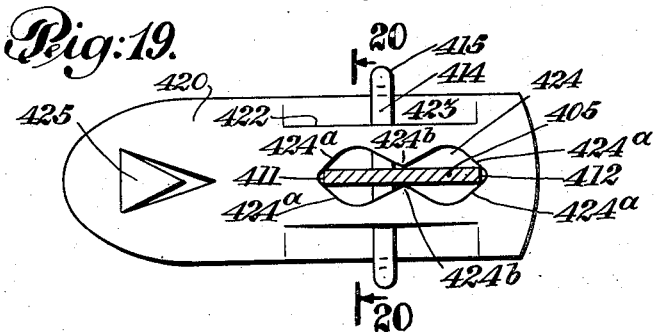 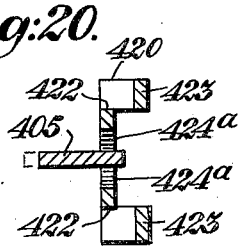
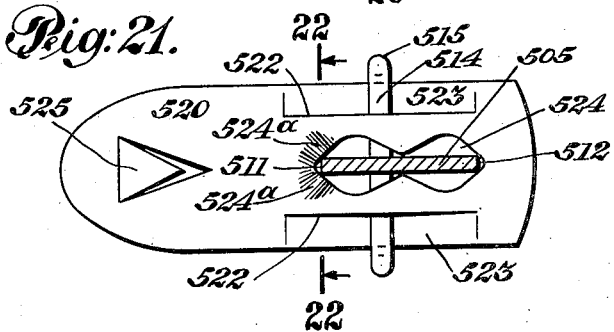 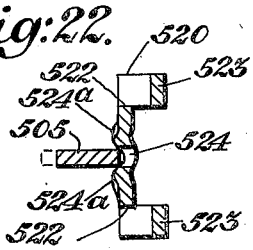
INVENTOR
Joseph D. Zahm
BY
ATTORNEY June 4, 1940.　　　　　J. D. ZAHM　　　　　2,202,938
ANIMAL TRAP
Filed Dec. 3, 1938　　　5 Sheets-Sheet 5

Patented June 4, 1940

2,202,938

UNITED STATES PATENT OFFICE 2,202,938

ANIMAL TRAP

Joseph D. Zahm, Lititz, Pa., assignor to Animal Trap Company of America, Lititz, Pa., a corporation of Pennsylvania Application December 3, 1938, Serial No. 243,699

14 Claims. (Cl. 43—83.5)

My invention consists in the novel features hereinafter described, reference being had to the accompanying drawings which illustrate several embodiments of the invention, selected by me for purposes of illustration and the said invention is fully disclosed in the following description and claims.

My invention is an improvement in traps for rodents and other small animals, such as are used particularly for rats and mice. These traps must of necessity be sold at a very low price and must therefore be capable of being made extremely cheaply, while at the same time they must be sufficiently rugged to stand repeated use.

One of the features of my improved trap is the utilization of a locking plate capable of being stamped out of sheet material and provided at one end with a detent to engage the crossbar of the usual spring actuated jaw, and having beveled or inclined cam face for engaging the jaw in the set position of the trap in such manner that the tension of the spring tends to move the locking plate endwise in a direction to release the jaw, the locking plate being also provided with a second cam face adjacent to the detent and substantially parallel to the first mentioned cam face and in rear thereof, to be engaged by the jaw and effect the rearward movement of the locking plate. The locking plate is supported in such manner as to permit the rear end to slide horizontally and the forward end of the locking plate is provided with means for engaging a fixed part of the trap, which may be, for example, the pivoted shaft of the jaw, or a pivoted support for a bait pedal cooperating with the locking plate in such manner that under the action of gravity, and also under the action of the spring actuated jaw in the set position of the trap, the locking plate may be held against horizontal movement in a direction to release the jaw, but can be freed from such restraint by slight elevation of the forward end of the locking plate.

Another feature of my invention is the combination with the locking plate above characterized, of a pivoted bait pedal which is pivotally mounted upon the stationary part with which the locking plate has its locking engagement whether it be the jaw pivot shaft, or a separate pivot, the said bait pedal having an elongated slot extending on both sides of the pivot to receive the forward end of the locking plate, which is also provided with cam portions coacting with the edges of the slot in the pedal, so that a movement of the pedal upwardly or downwardly, or to the right or to the left or in any intermediate direction, will effect the raising of the forward end of the locking plate and the release of the jaw if in set position. The pedal is also preferably loosely connected with its pivot so as to permit it to be moved backwardly and forwardly, each of which movements will cause the end of its slot to engage one of the cam portions at the forward end of the locking plate and raise it to release the jaw if the trap is set. There is thus provided a very simple, substantial and cheap construction in which the trap can be automatically set by simply moving the jaw to set position, and which can be tripped or sprung by a movement of the pedal in any one of six directions, or in other words, by a movement forward, backward, up, down or toward either side.

Referring to the accompanying drawings,

Fig. 1 is a plan view of one embodiment of my invention.

Fig. 2 is a longitudinal vertical section thereof, on line 2—2 of Fig. 1, showing the parts in set position.

Fig. 3 is a partial view similar to Fig. 2, illustrating in full lines the tripping of the locking lever to spring the trap by a downward movement of the bait pedal, and in dotted lines by the upward movement of the bait pedal.

Fig. 4 is a view similar to Fig. 3, showing the locking plate moved forwardly by the spring actuated jaw in releasing itself from the locking detent.

Fig. 5 is a view similar to the preceding figure, showing the jaw in the sprung or released position.

Fig. 6 is a similar view illustrating the automatic setting of the trap by swinging the jaw into engagement with the setting cam, and thereby moving the locking plate rearwardly.

Fig. 7 is a view similar to Fig. 6, showing the locking plate moved rearwardly to bring the detent into engagement with the jaw just before the forward end of the locking plate assumes the position shown in Fig. 2.

Fig. 8 is a view similar to Fig. 2, showing the forward end of the locking plate raised by the forward movement of the pedal.

Fig. 9 is a similar view showing the raising of the forward end of the locking plate by the rearward movement of the pedal.

Fig. 10 is a detailed plan view, partly in section, showing the pedal and the slot therein engaged by the forward portion of the locking plate.

Fig. 11 is a section on the line 11—11 of Fig. 10.

Fig. 12 is a view similar to Fig. 10, showing the movement of the pedal in one direction laterally to effect the release of the trap.

Fig. 13 is a section on the line 13—13 of Fig. 12.

Fig. 14 is a view similar to Fig. 12, showing the movement of the pedal in the opposite direction sideways to effect the release of the trap.

Fig. 15 is a section on the line 15—15 of Fig. 14.

Fig. 16 is a partial view, similar to Fig. 2, illustrating a slight modification, in which the forward end of the locking plate engages the pivoted shaft of the jaw upon which also the bait pedal is pivoted and movably mounted.

Fig. 17 is a view similar to Fig. 10, illustrating a slightly modified form of the slot in the bait pedal.

Fig. 18 is a section on the line 18—18 of Fig 17.

Fig. 19 is a view similar to Fig. 17, showing a bait pedal having another slightly modified form of slot.

Fig. 20 is a section on the line 20—20 of Fig. 19.

Fig. 21 is a view similar to Figs. 17 and 19, showing a bait pedal embodying another slightly modified form.

Fig. 22 is a sectional view on line 22—22 of Fig. 21.

Figure 23:
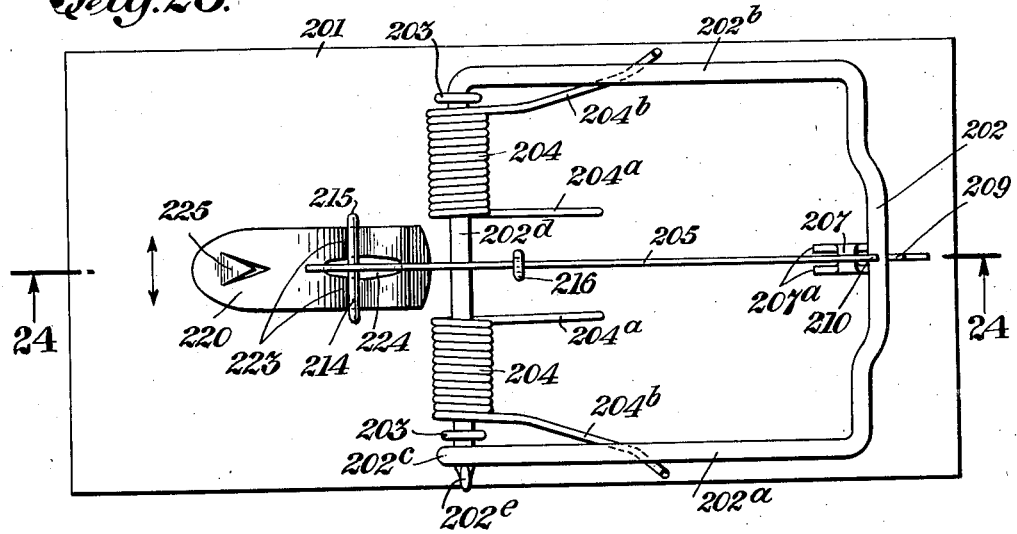
Fig. 23 is a plan view, similar to Fig. 1, of a slightly modified form of trap, in which a guiding staple engages the forward portion of the locking plate and limits its upward movement.

Referring to the embodiment of my invention illustrated in Figs. 1 to 15 inclusive, 1 represents a base plate, ordinarily constructed of wood, but which might obviously be made of any other suitable material. The jaw, as usual, comprises the crossbar 2, integral arms 2a and 2b, the arm 2a being provided with an eye 2c and the arm 2b being provided with an integral pivot 2d passing through the eye 2c, and secured by upsetting as at 2e, in the usual manner. In this instance I have shown the pivot 2d secured to the base by means of staples 3, 3. I have also shown, in this instance, two separate coil springs, indicated at 4—4, each of which has an end portion 4a and an actuating arm 4b engaging one of the arms of the jaw. 5 represents the locking plate, which is provided at its rear end with a substantially horizontal slot 6, engaging loosely a pivotal support 7 secured to the base plate, and which is preferably in the form of a staple of sheet metal having lateral guiding portions 7a which hold the locking plate in vertical position while permitting it to move freely backward or forward, and also permitting a slight pivotal movement on the pivot 7, as hereinafter described.

Above and slightly to the rear of the pivot 7 the locking plate is provided with an open slot formed between an inclined cam edge 8, constituting a detent, for engaging and holding the crossbar 2 of the jaw in set position, and a cam edge 9, which I term the setting cam, adapted to be engaged by the crossbar 2, to move the locking plate rearwardly and bring the detent over the cross bar, as hereinafter pointed out. There is also provided a third cam face, indicated at 10, on the upper side of the detent, the purpose of which will be hereinafter referred to.

The forward end of the locking plate 5 is provided with two oppositely disposed inclined cam faces, indicated at 11, 12, respectively, between which there is a downwardly extending locking projection 13, in this instance positioned to engage either the forward or the rear side of the pivot 14, for the bait pedal, which is usually the horizontal portion of a staple 15 driven into the base, but which may be the pivot 102d, as indicated in Fig. 16, in which the bait pedal is shown mounted upon that pivot instead of upon a separate pivot, as in Figs. 1 to 15. Below the projection 13 the forward end of the locking plate is shown in Figs. 1 to 15 as being provided with a stop projection 16, extending beneath the pivot 14 in order to limit the upward movement of the forward end of the locking plate and prevent it from getting out of its operative relation to the other parts. In some instances, however, this stop projection may be dispensed with and the upward movement of the forward end of the locking plate can be restricted by means of a staple, as indicated at 216 in Figs. 23 and 24, which may likewise guide the locking plate in its vertical movement. The locking projection 13 is so located that when it is in the rear of the pivot 14, as shown in Fig. 2 for example, the locking plate will be in set position so that the cam face 8 of the detent is in engagement with the crossbar 2 of the jaw.

20 represents the bait pedal, which is loosely pivoted upon the supporting pivot 14, in this instance provided by the staple 15. The connection between the pedal 20 and the pivot 14 is such as to permit the pedal to be moved inwardly or forwardly, or twisted laterally in the manner indicated in Figs. 12 and 14, for example. This is conveniently accomplished by forming on each side of the center of the bait pedal an elongated slot, indicated at 21. These slots can be provided in many ways, but I have found it convenient to form longitudinal slits in the pedal, indicated at 22, parallel to the lateral edges and to bend the lateral portions 23 downwardly to form the elongated slots 21 through which the crossbar of the staple can be inserted before it is driven into the wood or otherwise secured to the base. The pedal is also provided centrally with a longitudinal slot indicated at 24 which is preferably made about twice as wide as the thickness of the locking plate 5 and rounded at its ends, as indicated in the drawings in Figs. 1, 10, 12 and 14, for example. This slot receives the downwardly extending portion of the forward end of the locking plate, as clearly shown in Fig. 2, in such manner that the cam portions 11 and 12 of the latter engage the opposite ends of the slot 24 in the set position of the trap, in which the projection 13, as before stated, is in the rear of the pivot 14.

It will thus be seen that a movement of the bait pedal downwardly, as shown in Figs. 3 and 4, or upwardly as indicated in dotted lines in Fig. 3, or forwardly as shown in Fig. 8, or rearwardly as shown in Fig. 9, or laterally in either direction as indicated in Figs. 12 to 15, will effect the lifting of the forward end of the locking plate sufficiently to permit the locking projection 13, which preferably has a rounded lower edge, to pass over the top of the pivot 14 if the locking plate is moved in a direction forwardly, as it will be by the action of the spring actuated jaw on the cam detent face 8, as will readily be seen in Fig. 4, for example. The bait pedal may be provided with the usual projection or equivalent construction, as indicated at 25, for the attachment of the bait.

The operation of the trap illustrated in Figs. 1 to 15 is as follows. Assuming that the parts are in the released position illustrated, for example, in Fig. 5, the jaw is swung upon its pivotal connection rearwardly until the crossbar 2 engages the setting cam edge 9 of the locking plate 5, as indicated in Fig. 6. As this cam is located in the rear of the pivotal support 7 for the locking plate the forward end of the locking plate will be slightly raised as far as permitted by its stop, 16 as indicated in that figure, and as the crossbar 2 is pressed upon the inclined setting cam edge 9 the locking plate will be drawn rearwardly in the direction of the arrows in Fig. 7 so as to bring the detent cam edge 8 above the crossbar 2, so as to hold the jaw in set position, and simultaneously bring the projection 13 to the rear of the pivot 14 of the bait pedal. When the operator releases the jaw, the crossbar 2 will engage the detent cam 8 under the action of its spring, which immediately tilts the forward end of the locking plate downwardly into the position shown in Fig. 2, with the projection 13 to the rear of the pivot 14, thus preventing the locking plate from forward movement. The downward pressure exerted on the forward end of the locking plate by the spring actuated jaw also causes the inclined cam portions 11 and 12 to engage the opposite ends of the slot 24 in the bait pedal. This will also have the effect of substantially centering the pivot 14 in the longitudinal slots 21 of the bait pedal, as clearly indicated in Fig. 15. The trap is thus automatically set and will remain in set position until the bait pedal is disturbed and moved in any one of the six directions before referred to or any intermediate direction. For example, if the forward end of the bait pedal is depressed, as indicated in Figs. 3 and 4 in full lines, the rear end of the slot 24 will engage the cam portion 12 and lift the locking plate high enough to permit the projection 13 to pass over the upper surface of the pivot 14 and the upward thrust of the crossbar 2 on the detent cam 8 will cause the locking plate to move bodily forward, as indicated in Fig. 4, releasing the jaw, which immediately returns to its released position, indicated in dotted lines in Figs. 1 and 2, striking the animal with great force. Exactly the same result will occur if the bait pedal is raised, as indicated in dotted lines in Fig. 3, in which case the forward end of the slot 24 in the bait pedal will engage the inclined cam portion 11 of the locking plate and release the jaw.

As indicated in Fig. 8, it will also be seen that if the bait pedal is drawn forward in the direction of the arrow in that figure, the rear end of the slot 24 will engage the cam edge 12 of the locking plate and raise the projection 13, so as to release the jaw, and likewise, as clearly shown in Fig. 9, if the bait pedal is moved rearwardly in the direction of the arrow in that figure, the forward end of the slot 24 in the bait pedal will engage the cam edge 11 of the locking plate and lift the projection 13 above the pivot 14 and release the jaw.

Figs. 12 to 15 inclusive show that a lateral movement of the bait pedal in either direction, which is permitted by the elongated slots 21 engaging the pivot 14 and the additional width of the slot 24, will cause one or other of the edges of the slot 24 to engage one or both of the cam edges 11, 12 of the locking plate and effectively lift said plate so as to carry the projection 13 above the pivot 14 and release the trap.

In all these release movements of the trap, it will be noted that as the upper surface of the pivot 14 is curved and the lower surface of the projection 13 is oppositely curved, and as the upward pressure of the crossbar 2 of the jaw under the action of the springs 4 tends to force the locking plate forward, it is not necessary to lift the forward end of the locking plate completely clear of the pivot 14 before the locking plate begins to move forward, as the slightest elevation of the forward end of the locking plate will enable the curved surface of the projection 13 to ride over the oppositely curved surface of the pivot 14 and permit the locking plate to move forward to release the jaw. This construction makes the trap exceedingly sensitive, so that the slightest manipulation of the bait by the rodent in any of the six directions above referred to or in any intermediate direction will instantly release the jaw from its set position.

In ordinary self-setting traps, it frequently happens that the locking parts get into their set position when the jaw is in released position, and therefore when the operator attempts to set the jaw against the heavy spring, or springs, with which it is provided, it becomes impossible to set the trap by reason of the fact that the detent is in its set position, and held there by the bait pedal, so that the operator must release the jaw and place the locking parts in released position, and begin over again, or attempt with one hand to release the locking parts while holding the jaw with the other hand. In either case, the operator is exposed to the danger of a blow from the jaw in case his hold on it becomes accidentally released, with the result that annoying and sometimes painful and serious accidents result, especially in the case of rat traps, in which an extremely powerful spring, or springs, is or are provided. In order to prevent the possibility of such a happening, in my improved trap, I provide the upper edge of the detent portion of the locking plate with the auxiliary setting cam before referred to, which is downwardly and rearwardly inclined, so that if the locking plate should accidentally be in its extreme rearward position, when the operator desires to set the trap the crossbar 2 will engage this auxiliary setting cam 10, which is also located in the rear of the pivot 7, thus raising the forward end of the locking plate to disengage the projection 13, which will then be on the forward side of the pivot 14, and permit the locking plate to move bodily forward into its proper position, indicated for example in Figs. 5 and 6, and enabling the crossbar 2 to immediately engage the setting cam 9 and set the trap in the normal manner.

It has been stated that the slot 24 in the bait pedal is of greater width than the locking plate and is preferably substantially twice the width of said plate, and this is my preferred construction, as it permits the lateral twisting of the bait pedal on its pivot 14, as shown in Figs. 12 to 15, for the purpose of acting on the forward end of the locking plate to raise it and release the jaw, as previously described. I wish it to be understood, however, that if the slot 24 is made of less width so that it substantially fits against the sides of the engaged portion of the locking plate, the resulting construction will be entirely operative, but the trap can only be tripped to release the jaw by upward, downward and forward or backward movements of the bait pedal, as will be readily understood. In other words, it will only release the trap by movements of the bait pedal in four directions instead of six, but otherwise it is entirely operative.

In Fig. 16, in which the parts corresponding with those previously described are given the same reference numerals with the addition of 100, I have shown a slight modification of the trap, in which the bait pedal is mounted in exactly the manner previously described, but upon the crossbar 102d, of the jaw, instead of upon a separate pivot as in Figs. 1 to 15, and the construction of the forward end of the locking plate 105 is likewise modified so that the projection 113 engages the rearward side of the jaw pivot 102d in the set position of the trap, as clearly shown in Figs. 16. Otherwise the construction and operation are exactly as previously described.

Figure 24:
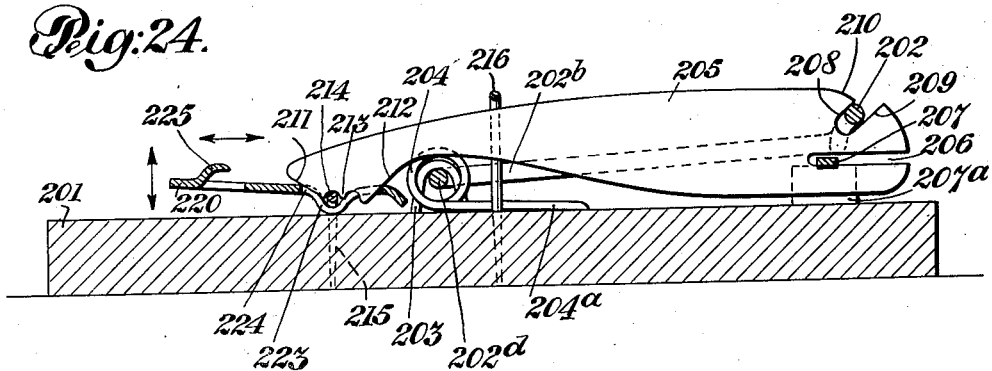
Fig. 24 is a longitudinal vertical section of the trap shown in Fig. 23, on the line 24—24 thereof.

In Figs. 23 and 24, in which the parts corresponding with those previously described are given the same reference characters with the addition of 200, I have shown another slight modification of the trap. In this instance the bait pedal is provided with a downwardly curved portion 223, intermediate its ends which rests on the base 201 and is engaged on its upper side by the pivot 214 formed by the crossbar of a staple 215, so as to form in effect a loose pivotal connection between the bait pedal and the base, the curved portion 223 being so constructed as to permit the bait pedal to be moved not only upwardly and downwardly, but backwardly and forwardly, and sidewise, in the same manner as previously described to effect the release of the trap. The longitudinal central slot 224 in the bait pedal is shown in this construction as of oval shape, which enables it to coact in the manner previously described with the forward end of the locking plate 205 to release the jaw by any one of the six movements indicated by the arrows in Figs. 23 and 24 and as previously described, without danger of accidental locking or wedging of the bait pedal beneath the forward end of the locking plate. In this instance, as previously stated, the stop for limiting the vertical upward movement of the forward end of the locking plate is also provided by the staple 216. The advantage of this construction resides mainly in the fact that the various parts can be more readily assembled, thus further cheapening the cost of production of the trap.

In Figs. 17 to 22 I have shown some slight modifications of the slot formation in the bait pedal which engages the forward end of the locking plate, the bait pedal being otherwise constructed substantially as shown in Figs. 1 to 15.

Thus, in Figs. 17 and 18, in which the parts corresponding with those previously described are given the same reference numerals with the addition of 300, the slot 324 is shown approximately diamond-shaped and the opposite edges adjacent to one end of the slot are provided with downwardly extending curved portions 324a forming opposite cam portions for engaging the inclined cam at the forward end of the locking plate 305 to facilitate the operation of the locking plate to release the trap by lateral movement of the bait pedal in either direction.

In Figs. 19 and 20, in which the parts corresponding with those shown in Figs. 1 to 15 are given the same reference numerals with the addition of 400, the slot 424 is given a double diamond-shape, so as to provide oppositely inclined portions 424a at opposite ends of the slot to engage the cam portions of the forward end of the locking plate 405, to facilitate the lifting of the locking plate and release of the jaw from set position by lateral movement of the bait pedal. The central portions of the slot, indicated at 424b extend inwardly on opposite sides of the adjacent portion of the locking plate and tend to hold it centrally of the slot while permitting the lateral movements of the bait pedal.

In Figs. 21 and 22, in which the parts corresponding with those described in Figs. 1 to 15 are given the same reference numerals with the addition of 500, the bait pedal 520 is provided with a slot 524 of the double diamond-shape previously described, but in this case one end of the slot is provided on opposite sides of the engaged portion of the locking plate 505 with upwardly curved portions 524a and similar projections may be provided at the opposite end if desired. These upwardly curved portions coact with one or both of the inclined cam portions at the forward end of the locking plate to raise it by lateral movement of the bait pedal in either direction.

In the above mentioned Figs. 17 to 22 inclusive, the locking plate may be provided with a stop to limit its upward movement either in the form of the projection 16 shown in Figs. 1 to 15 inclusive, for engaging the under side of the pivot, or in the form of the staple 216 shown in Figs. 23 and 24.

What I claim and desire to secure by Letters Patent is:

1. In a trap, the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, said locking plate having a locking device for engaging in set position a coacting part held against movement longitudinally of the base, to prevent said releasing movement of the locking plate, said pedal being provided with portions for engaging said locking plate to disconnect it from said part by the movement of the pedal.

2. In a trap, the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, and having a setting cam to be engaged by said jaw for moving the locking plate into set position, said locking plate having a locking device for engaging in set position a coacting part held against movement longitudinally of the base, to prevent said releasing movement of the locking plate, said pedal being provided with portions for engaging said locking plate to disconnect it from said part by the movement of the pedal.

3. In a trap, the combination of a base, a pivoted spring actuated jaw, a pivoted bait pedal, and a longitudinally movable locking plate having a loose pivotal connection with the base, and having in the rear of said pivotal connection a slot for receiving the jaw, provided on one side with a setting cam to be engaged by the jaw and effect a movement of the locking plate in a rearward direction, and provided on its opposite side with a detent provided with a cam edge engaged by the jaw in set position and tending to move the locking plate forwardly to release the jaw, the forward end of said locking plate being provided with a locking projection for engaging in the set position a part held against movement longitudinally of the base, and said bait pedal having portions for releasing said locking part by movement of the bait pedal.

4. In a trap the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, said locking plate having a locking device for engaging in the set position the pivot of said bait pedal, to prevent said movement, said pedal being provided with portions for engaging said locking plate to disengage said locking projection from said pivot, by the movement of the pedal.

5. In a trap, the combination of a base, a pivoted spring actuated jaw, a pivoted bait pedal, and a longitudinally movable locking plate provided at its rear end with a substantially horizontal slot, and a supporting pivot loosely engaging the same, and an open slot for receiving a portion of said jaw, said last mentioned slot having at one side an inclined setting cam extending rearwardly of said pivot and being provided on the other side with a detent cam for engaging the jaw in set position and tending to effect the movement of the locking plate in a direction to release said jaw, said locking plate being provided adjacent to its forward end with a locking device for engaging in the set position a cooperating part held against movement longitudinally of the base, to prevent said releasing movement of the locking plate, the engagement of the jaw with the setting cam disengaging said coacting parts to permit of setting the trap, said bait pedal having portions for engaging said locking plate and disengaging said coacting parts by the movement of the pedal to spring the trap.

6. In a trap, the combination of a base, a pivoted spring actuated jaw, a pivoted bait pedal, and a longitudinally movable locking plate provided at its rear end with a substantially horizontal slot, and a supporting pivot loosely engaging the same, and an open slot for receiving a portion of said jaw, said last mentioned slot having at one side an inclined setting cam extending rearwardly of said pivot and being provided on the other side with a detent cam for engaging the jaw in set position and tending to effect the movement of the locking plate in a direction to release said jaw, said locking plate being provided adjacent to its forward end with a locking device for engaging in set position a cooperating part held against movement longitudinally of the base, to prevent said releasing movement of the locking plate, the engagement of the jaw with the setting cam disengaging said coacting parts to permit of setting the trap, said bait pedal having portions for engaging said locking plate and disengaging said coacting parts by the movement of the pedal to spring the trap, said locking plate being provided with an auxiliary setting cam forward of the first mentioned setting cam and in the path of the jaw in the set position of the locking plate, for moving the locking plate into released position and permitting the jaw to engage the first mentioned setting cam to insure the automatic setting of the trap.

7. In a trap, the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, said locking plate having a locking device for engaging in set position a coacting part held against movement longitudinally of the base to prevent said releasing movement of the locking plate, said pedal being provided with tripping portions for engaging said locking plate forward and in the rear of said locking device for disconnecting said device from said coacting part by vertical rocking movement of the pedal in either direction.

8. In a trap, the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, said locking plate having a locking device for engaging in the set position, a coacting part held against movement longitudinally of the base, to prevent releasing movement of the locking plate, said pedal being movable longitudinally of the base with respect to its pivot and being provided with tripping means forward and in the rear of said locking projection, for engaging the locking plate and disengaging said locking device from its coacting part by a rocking movement of the pedal in either direction, and by an endwise movement of the pedal in either direction.

9. In a trap, the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, said locking plate having a locking device for engaging in the set position a coacting part held against movement longitudinally of the base to prevent said releasing movement of the locking plate, said locking plate being provided with oppositely inclined releasing cam portions respectively forward and in the rear of said locking part, and said pedal being loosely mounted on its pivot to permit endwise and lateral swinging movements thereof, and provided with a slot to receive said releasing cam portions for disengaging said locking projection from said coacting part by a movement of said pedal vertically, longitudinally or sidewise in either direction.

10. In a trap, the combination of a base, a pivoted jaw, a pivoted bait pedal, and a locking plate movable horizontally and longitudinally with respect to said base, and provided at its rear end with a supporting pivot loosely engaging the same, said locking plate being provided above said pivot with an open slot, one side of which forms a setting cam for engaging the jaw and moving the locking plate into set position, and the other side of which forms a detent cam for engaging the said jaw and tending to move the locking plate in a direction to release the jaw, the forward end of the locking plate being provided with a locking projection for engaging in the set position the pivot of the bait pedal to prevent said releasing movement of the locking plate, stop means for limiting the upward movement of said forward end of the locking plate, and said bait pedal being provided with portions for engaging the locking plate and effecting the disengagement of said locking projection from said pivot.

11. In a trap, the combination of a base, a pivoted jaw, a pivoted bait pedal, and a locking plate movable horizontally and longitudinally with respect to said base, and provided at its rear end with a supporting pivot loosely engaging the same, said locking plate being provided above said pivot with an open slot, one side of which forms a setting cam for engaging the jaw and moving the locking plate into set position, and the other side of which forms a detent cam for engaging the said jaw and tending to move the locking plate in a direction to release the jaw, the forward end of the locking plate being provided with a locking projection having a rounded extremity for engaging, in the set position, a coacting part having an oppositely rounded surface, held against movement longitudinally of the base, said bait pedal being provided with portions for engaging the locking plate in the set position to disconnect said locking projection from said coacting part by the movement of the pedal.

12. In a trap, the combination of a base, a pivoted jaw, a pivoted bait pedal, and a locking plate movable horizontally and longitudinally with respect to said base, and provided at its rear end with a supporting pivot loosely engaging the same, said locking plate being provided above said pivot with an open slot, one side of which forms a setting cam for engaging the jaw and moving the locking plate into set position, and the other side of which forms a detent cam for engaging the said jaw and tending to move the locking plate in a direction to release the jaw, the forward end of the locking plate being provided with a locking projection for engaging a coacting part held against movement longitudinally of the base, and releasing portions respectively forward of and in the rear of said projection, said bait pedal being loosely mounted with respect to its pivot to permit longitudinal, vertical and lateral swinging movements thereof, and being provided with a slot of greater width than the locking plate adapted to receive the releasing portions thereof, marginal portions of said slot being constructed to engage the releasing portions of the locking plate to disengage said locking projection from its coacting part by a movement of the bait pedal in any direction.

13. In a trap, the combination with a base, a spring actuated jaw having a pivot shaft connected with said base, a bait pedal mounted pivotally on said shaft, and a longitudinally movable locking plate having a detent provided with a cam edge for engaging said jaw in set position and tending to effect the movement of the locking plate in a direction to release said jaw, said locking plate having a locking device for engaging said pivot shaft in the set position, to prevent said movement, said pedal being provided with releasing portions for engaging the locking plate to disconnect the locking device from said shaft by movement of the pedal.

14. In a trap, the combination of a base, a pivoted spring actuated jaw, a pivoted bait pedal, and a longitudinally movable locking plate having a detent provided with a cam edge for engaging said jaw in set position, and tending to effect the movement of the locking plate in a direction to release said jaw, said locking plate having a locking device for engaging in set position a coacting part held against movement longitudinally of the base to prevent said releasing movement of the locking plate, said pedal being provided with portions for engaging said locking plate to disconnect it from said part by the movement of the pedal, and a guiding staple secured to said base and embracing the locking plate for limiting the movement of the locking plate in a direction away from the pedal.

JOSEPH D. ZAHM.